United States Patent [19]

Montalvo

[11] 4,151,624

[45] May 1, 1979

[54] ROTARY BRUSH MECHANISM

[76] Inventor: Romeo Montalvo, Rt. 1, Box 228, Grass Lake Rd., Antioch, Ill. 60002

[21] Appl. No.: 757,984

[22] Filed: Jan. 10, 1977

[51] Int. Cl.² .............................................. A46B 13/06
[52] U.S. Cl. .......................................... 15/23; 15/29; 15/97 R
[58] Field of Search ............... 15/23, 24, 28, 29, 97 R; 51/170 PT, 170 T

[56] References Cited

U.S. PATENT DOCUMENTS

| 1,412,400 | 4/1922 | Gasser | 15/24 X |
| 1,433,160 | 10/1922 | Shoemaker | 15/24 X |
| 2,540,240 | 2/1951 | Boyle | 15/29 |
| 2,678,457 | 5/1954 | Demo et al. | 15/29 |

*Primary Examiner*—Edward L. Roberts
*Attorney, Agent, or Firm*—Lester N. Arnold

[57] ABSTRACT

A hand-manipulated rotary brush mechanism employs flywheel gear means and associated gear assembly means to provide rotary motion for brush applicator means, said flywheel gear means providing suitable blade means thereon which are projected into the flow path of a continuous fluid flow stream as channeled through the rotary brush mechanism, and said flywheel gear means being larger and heavier than and combined with the associated gear assembly means which directly supply the rotary motion of the brush applicator for the purpose of providing opposition against and moderation through inertia of movement of any fluctuation of rotational speed of the brush applicator.

7 Claims, 14 Drawing Figures

ROTARY BRUSH MECHANISM

BACKGROUND OF THE INVENTION

This invention relates to a rotary brush mechanism driven by a pressurized water supply, and more particularly, to a hand-manipulated disc-shaped vehicle brushing unit having improved flywheel means connectible to an ordinary garden-variety hose.

The pertinent art is replete with car washing manual brushing apparatus in addition to direct drive (automatic) motor-powered vehicle washing apparatus. The present invention makes advantageous application through the use of a flywheel gear of the pressurized water supply that is commonly available during the washing of a vehicle. The flywheel gear provides a required magnification of force between the applied water pressure and the spinning action of an outer rotary brush casing. It is thought that existing prior art brush devices do not make use of a flywheel gear to develop a magnified force with which to power movement of a scrubber, the flywheel gear being spun by application of a pressurized water supply. All hand-held brush devices for vehicle scrubbing applications as known to the applicant herein are thought to be either manual or to be driven by direct drive mechanisms.

The present invention is particularly useful in adapting the common source of pressurized water supply to power an improved strong rotary movement of an outer brush casing having pad and bristle means thereon for contacting the vehicle surface to be cleaned. It is desirable to avoid complex and expensive washing apparatus having high initial costs and extensive maintenance factors where the application is for home use as opposed to commercial or industrial uses. It is also desirable to harness an available power source of pressurized water through the economical and simple employment of a flywheel gear used in conjunction with gear assembly means to magnify the force of the striking water to give added inertia of movement to a rotatable outer brush casing.

The present invention is comprised of a disc-shaped rotary brush unit having a rotating outer brush casing or housing enclosure defining an interior cavity containing improved gear means including flywheel gear means communicating with a fluid outlet chamber or housing through which pressurized water flow is directed. The flywheel gear means is caused to rotate by means of the combined forces of water directly striking suitable blade means on the peripheral portion of the flywheel in addition to the phenomenon of an increase in water pressure building against said blade means as the same pass through a closely spaced chamber portion of the fluid outlet chamber containing water outlet orifices. The inertial movement of the flywheel gear is used to provide rotary motion for the outer brush housing through a reduction gear assembly intended to increase the rotational momentum of the outer brush housing in order to decrease tendencies for stoppage and slowing of brushing action with applied pressures against the outer housing during buffeting and scrubbing of the surfaces to be cleaned.

SUMMARY

It is therefore an object of the present invention to provide an improved rotary brush mechanism having flywheel gear means powered to rotate by application of a pressurized fluid flow stream.

It is another object of the invention to provide improved flywheel gear means having suitable blade means upon which a fluid flow stream forcedly strikes and suitable compartment means are provided within which mounting fluid pressures are applied to said blade means as said blade means pass therethrough.

It is still another object to provide reduction gear assembly means with which to regulate rotational speed of movement of an outer brush casing in relationship to the rotational speed of movement of said flywheel gear means.

It is a further object to provide a plurality of apertures in the outer brush casing for providing an outlet for the incoming fluid flow stream to facilitate discard of said fluid after having applied forces to said flywheel gear means.

It is still a further object of the invention to provide several alternative embodiments for said flywheel gear means wherein said blade means are selectively protruded or recessed.

It is yet an object thereof to provide that said flywheel and reduction gear assembly means should provide the drive for an extendable shaft brush device.

It is yet another object to provide for a minimum of moving parts, economy of design, lightweight construction and soundness of structure for multiple use application.

In one embodiment of the invention, an outer rotary brush casing or housing enclosure has a circular apertured side wall and top and bottom walls defining an interior space or cavity within which gear means are pivotable mounted, said gear means including flywheel gear means having blade means comprising in-line obstruction or protrusion means thereon against which are applied a pressurized fluid flow stream. A fluid outlet chamber is provided to surroundingly receive a selected peripheral edge portion of said flywheel gear means, said fluid outlet chambers having multiple orifices through which said fluid is directed to strike against adjacent ones of said blade means to provide the applied force required to rotate said flywheel gear means. Rotary motion is thereby transmitted through said pivotally mounted reduction gear means to the outer rotary brush casing, which casing, when fitted with suitable brushes and fabric pads, spins against an applied vehicular surface with a resultant scrubbing cleansing effect.

In another embodiment of the invention, the flywheel gear means is provided with blade means comprising in-line recesses or indentations formed in the peripheral edge portion of said flywheel gear means. These indentation blade means are rotated closely adjacent to said fluid outlet orifices so that the resultant fluid filling action acts to provide the forces to rotate the flywheel gear means. Both the protrusion blade means and the indentation blade means comprise primary blade means and there are provided as secondary blade means two parallel-spaced rows of indentation blade means, each spaced on an opposite side of said primary blade means.

In still another embodiment of the invention, a gear mounting chamber is extended to entirely encompass the flywheel gear means and is provided with in-line indentation blade means extending along its generally central inner peripheral diameter. The flywheel gear means is provided with internal fluid flow chambers to comprise the fluid outlet chamber, which internal fluid chambers have narrowed orifice outlets within the generally central outer peripheral edge portion thereof. Such orifice outlets are closely spaced from said indentation blade means in order to provide a means of filling said indentation areas or pockets with fluid to provide a resultant applied force to the pivotally mounted flywheel gear means.

In yet other embodiments of the invention, the reduction gear means are alternatively arranged to provide different gear driving actions for alternative spacing requirements. In addition thereto, an alternative embodiment is shown in the drawings wherein said flywheel gear means and said reduction gear means are employed to spin an extended shaft having an apertured outer end portion fitted with suitable brushes or fabric pads to supply the scrubbing cleansing action. The shaft is encircled by worm gear means and extends within a fluid carrying hollow enclosure whereby fluid is carried by said rotating worm gear means to the extended extremities of the shaft to find outlet at the apertured outer end portion thereof.

DETAILED DESCRIPTION

Figure 1:
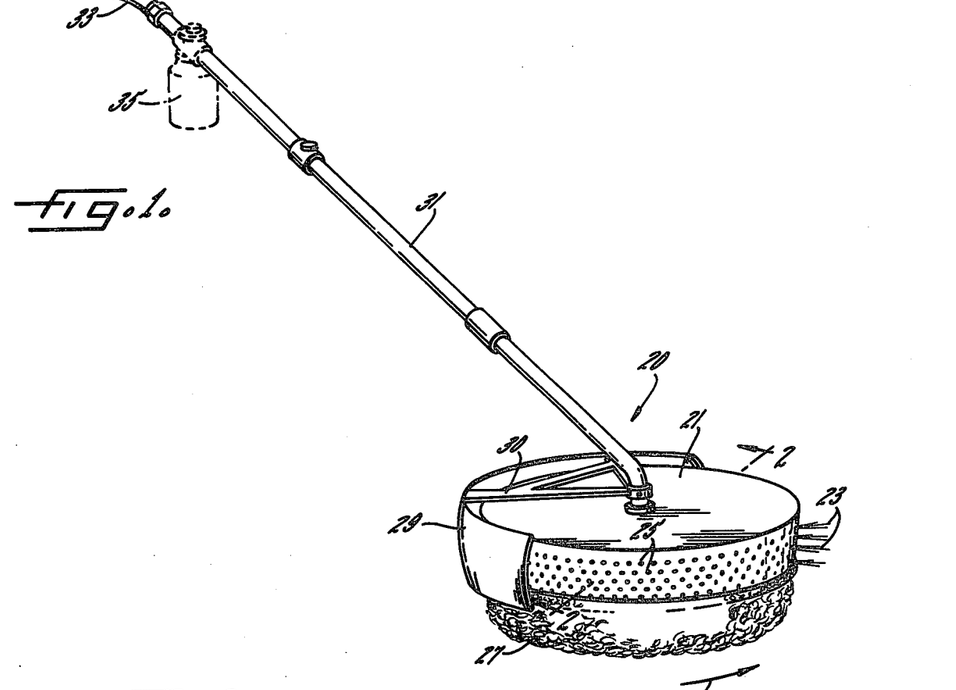
FIG. 1 is a pictorial perspective representation of a preferred embodiment of the invention showing the rotary brush unit with attached guard means and fluid-carrying handle means.

There is shown in FIG. 1 the primary embodiment of a rotary brush device or unit 20 including an outer circular-like or disc-shaped tubular brush casing or housing enclosure means 21 which is rotatable in the direction of the arrow 22. The brush casing 21 includes exterior brush bristles 23 extending therefrom, a plurality of apertures 25 therethrough and scrubbing pad means 27 fitted thereon. Suitable shield means 29 encircles a selected portion of the rotary brush casing 21 to provide a guard against fluid spray during the use of the device 20. The shield 29 is suitably attached as by brace members 30 to hollow fluid-carrying handle means 31 to which can be attached a standard variety of hose 33 for providing a source of pressurized fluid to be used in connection with the intended application of the rotary brush unit 20, namely, the scrubbing and cleansing of vehicles having large smooth surface areas such as automobile vehicles wherein the fluid is preferably water. If desired, container means 35 can be suitably attached to handle means 31 or hose 33 to provide a supply of selected cleansing agent used in water solution according to techniques commonly known to be employed in such applications.

Figure 2:
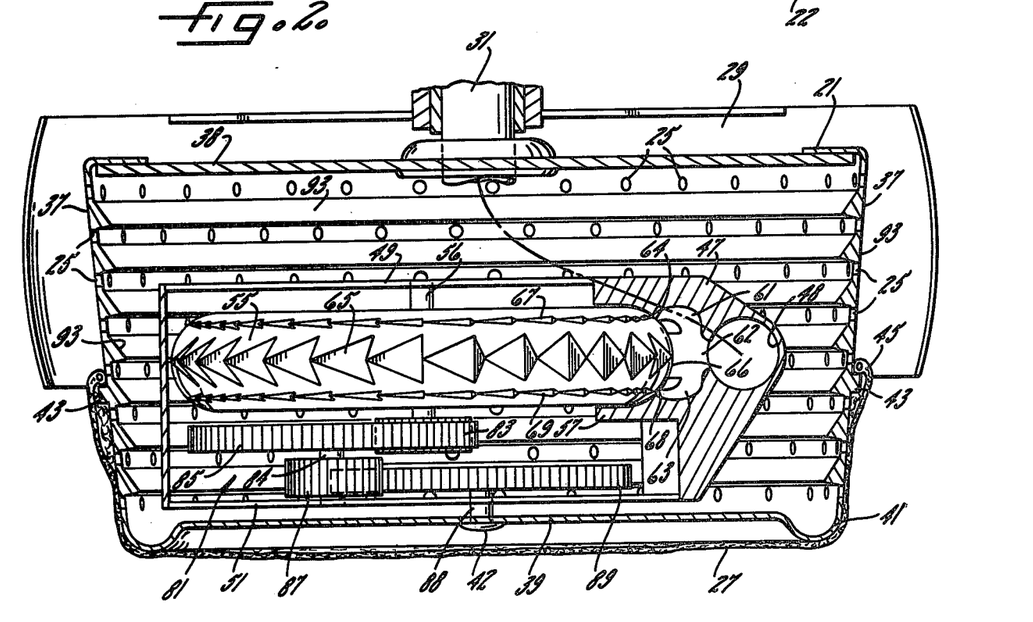
FIG. 2 is a cross sectional view of the rotary brush unit of FIG. 1 taken generally along the line 2—2 as shown in FIG. 1.

FIG. 2 is a cross-sectional view of FIG. 1 taken generally along the line 2—2 of FIG. 1 showing the rotary brush casing 21 to have an apertured circular side wall 37, a top cover wall 38 and a recessed bottom wall 39 forming an outer circular ridge portion 41 extending beyond the recessed bottom wall 39 so as to desirably provide spacing between the pad means 27 and the bottom wall 39 for preventing frictional contact of the pad 27 with a terminal portion 42 of a gear mounting shaft as more fully set forth hereinafter. The apertured side wall 37 is provided with a circumfertial ledge portion 43 over which an elastic band 45 can be fitted to secure the attachment of the pad means 27 to the rotary brush casing 21 substantially as shown in FIGS. 1 and 2.

The circular side wall 37 together with the top wall 38 and the bottom wall 39 define an interior cavity containing support housing means including fluid outlet chamber means 47. The fluid outlet chamber 47 includes a main fluid-carrying chamber 48 connected to receive fluid flow (as indicated by the dashed line of FIG. 2), from fluid-receiving tubular handle means 31, and further having as a part of the support housing at least upper and lower interior brace or support members 49 and 51, respectively, to which gear assembly means are pivotably mounted. In accordance with the principle of the present invention, there is provided first or flywheel gear means 55 pivotably mounted on a center shaft 56 forming a central axes of rotation therefor. The flywheel gear 55 is mounted so that a selected portion of the outer peripheral edge portion thereof is closely spaced from a surrounding trough portion 57 of the support housing, and more particularly, the fluid outlet chamber 47.

Figure 3:
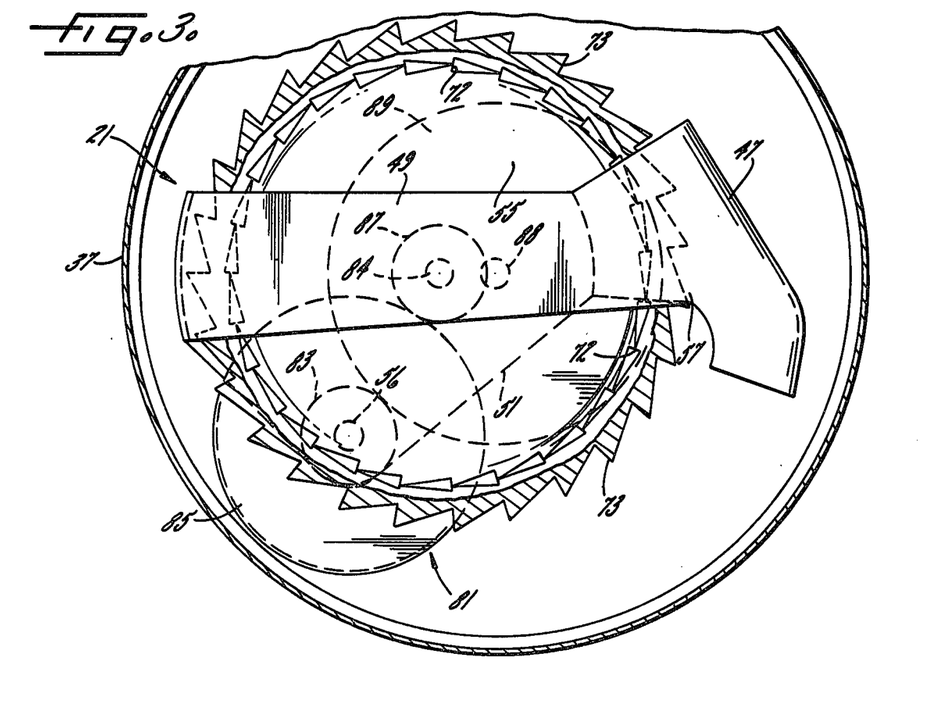
FIG. 3 is a partial sectional top view of the rotary brush unit of FIG. 1 without cover means showing an interior fluid outlet chamber, suitable frame support members, flywheel gear means and accompanying gear assembly means.
Figure 4:
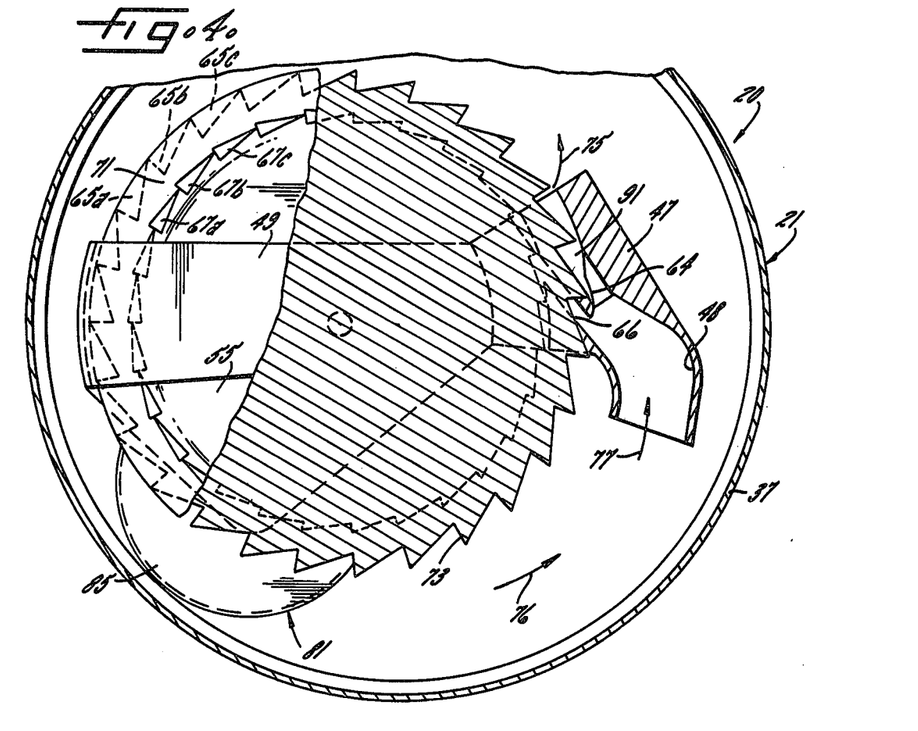
FIG. 4 is a partial sectional top view as shown for FIG. 3 but showing an additional fractional section of the flywheel gear means and fluid outlet chamber.

FIGS. 3 and 4 show a top view of the rotary brush casing 21 containing the flywheel gear 55 and the fluid outlet chamber 47, including upper and lower brace support members 49 and 51. The fluid outlet chamber 47 includes auxiliary or secondary fluid chambers 61 and 63 and a primary central fluid chamber 62 which communicate with the main fluid chamber 48, and which fluid chambers 61–63 are narrowed down to provide outlet orifices 64, 66 and 68, respectively, through which the fluid flow is directed against the flywheel gear 55 to provide direct fluid striking, driving force by which the flywheel gear 55 is rotated about its central axis 56. The flywheel gear 55 is provided with suitable in-line recesses or indentations comprising primary blade means 65 centrally located on the peripheral edge portion of the flywheel gear 55. Secondary blade means 67 and 69 are provided by suitable in-line recesses or indentations spaced oppositely of the primary blade means 65 and formed in the outer peripheral edge portion of the flywheel gear 55.

In the practice of the present invention, the outer peripheral portion of the flywheel gear 55 is closely spaced from the fluid outlet chamber 47 with the primary blade means 65 aligned to receive the fluid flow from the central chamber 62 and the secondary blade means 67 and 69 aligned to receive the fluid flow from the auxiliary side chambers 61 and 63, respectively. The narrowed outlet orifices 64, 66 and 68 add impetus to the striking force of the fluid flow from the fluid outlet chamber 47 and direct the fluid flow into the plurality of recessed blade means 67, 65 and 69, respectively. Additionally, the closely spaced position of the orifices from adjacent ones of the passing recessed blade means create a restricted space area preventing immediate expansion of the pressurized fluid flow and adding to the driving force which is applied to rotate the flywheel gear 55.

There is shown in FIG. 4 a top view of the flywheel gear 55 having an outer surface 71 into which the primary and secondary blade means 65, 67 and 69 are formed as recessed spaces. There is shown at 65a, 65b and 65c and at 67a, 67b and 67c a plurality of the recessed cavities comprising blade means 65 and 67, respectively. For illustration purposes, the outer surface 71 of the flywheel gear 55 is shown partially removed to more clearly show the preferred saw tooth pattern of the recessed blade means 65. For example, an individual blade 65 is shown in FIG. 4 to have a shoulder face 73 against which the fluid flow is directed upon exiting from the orifice 66. The pressurized fluid flow fills the recessed cavity of the blade means 65 during the rotation of the flywheel gear 55, and the fluid is held therein and carried through the confines of the closely spaced fluid outlet chamber 47 beyond which the fluid is released to dump in the direction of the arrow 75 in FIG. 4. The rotation of the flywheel gear 55 is indicated by the direction of the arrow 76 in FIG. 4, and the fluid flow into the main fluid chamber 48 is shown by the arrow 77.

FIG. 3 shows the top surface 71 of the flywheel gear 55 entirely cut away around the peripheral outer portion of the gear 55 to expose the saw tooth pattern of the primary blade means 65. FIGS. 3 and 4 clearly show the adjacent spacing of secondary blade means 67 which are provided as generally shallow recesses in the top surface 71 of the flywheel gear 55. Each of these recesses 67 are provided with a shoulder face 72 against which the fluid flow is directed upon exiting from the serving orifice 64. It should be understood that the provision of the secondary blade means 67 and 69 are not considered essential to the rotational drive of the flywheel gear 55, but are provided as auxiliary blade means only. Further, it is to be noted that the top surface 71 of the flywheel gear 55 could optionally as well be formed to terminate at the deepest point of the trough formed by the shoulder face 73 so as to provide a protruding blade means 65 so long as the encapsulating portion 57 of the fluid outlet chamber 47 is shaped to enclose the protruding blade 65 and restrain loss of fluid until the fluid is carried entirely through the encapsulating portion 57.

With reference to FIGS. 2–4 of the drawing, second or reduction gear assembly means 81 are employed in conjunction with the rotating flywheel gear 55 to provide a reduction in the diameter (an increase in rotational speed) of the drive gear which drives the rotation of the outer brush casing 21. The reduction gear assembly means 81 is comprised of a first pinion gear 83 fixedly mounted on a lower portion of the central axial shaft 56 for the flywheel gear 55, a first reduction gear 85 having the teeth thereof meshed to engage with the first pinion gear 83, a central shaft 84 providing the pivotal central axis for the rotating first reduction gear 85, a second pinion gear 87 attached to a lower portion of the central axial shaft 84, and a second reduction gear 89 having the teeth thereof meshed to engage with the second pinion gear 87. The second reduction gear 89 is centrally mounted about a shaft 88 which is intended to turn with the rotation of the gear 89 so as to turn the outer brush casing 21. To this end, the shaft 88 is provided with a terminal shaft portion 42 which is fixedly attached to the central rotational axis of the bottom wall 39 for the brush casing 21.

The reduction gear assembly 81 is provided to convert the slower rotational speed of the flywheel gear 55 into a higher rotational speed for the outer brush casing 21, and in addition thereto, the larger heavier flywheel gear 55 provides for opposition and moderation through its inertia of movement of any fluctuation of rotational speed in the outer brush casing 21 as might be experienced in connection with frictional contact with any surfaces to be cleaned. It is to be understood that while the provision of the flywheel gear 55 and an accompanying gear assembly is fundamental to the principle of the present invention, the particular embodiment of the gear assembly 81 is not the only such embodiment which could be utilized and it is within the scope of this invention that alternative embodiments thereof could be substituted for the gear assembly 81.

According to the operation of the invention as hereinbefore set forth, the brush unit 20 is to be connected to a standard variety of garden water hose 33 in preparation for the scrubbing and cleaning of an automobile vehicle or perhaps even a floor area. The force of the pressurized water supply when applied to the blade means 65 of the flywheel gear 55 through the fluid outlet chamber 47, causes the flywheel gear 55 to rotate thereby to provide through the connecting gear assembly 81, drive means for rotating the outer brush casing 21 at a higher rotational speed than the rotational speed of the flywheel gear 55. The fluid flow strikes against blade means 65 and fills recesses 91 (FIG. 4) formed immediately behind said blade means in cooperation with the encapsulating portion 57 of the fluid outlet chamber 47, as illustrated most clearly in FIG. 4. The pressurized fluid is prevented from expanding beyond the limits of the confined recesses 91 and thereby is thought to create an added pressure applied to blade means 65 to provide for the rotation of the flywheel gear 55. As a selected one of the recesses 91 is filled, the rotation of the flywheel gear carries the recess 91 away from the associated fluid orifice 64 and another recess 91 is presented to the fluid flow from the orifice 66. After the water filled recess area 91 exits from the encapsulating portion 57 of the adjacent fluid outlet chamber 47, the centrifugal rotational force of the flywheel gear 55 exits the water in the direction of the arrow 75 of FIG. 4. The rotational action of the flywheel gear 55 and the outer brush casing 21 readily present means for ridding the brush unit 20 of the accumulation of water, which accumulation would quickly render the brush unit 20 too heavy for effective rotation, through the use of the centrifugal forces provided by the flywheel gear 55 and the brush casing 21. Hence, the water is forced outwardly from the flywheel gear 55 and from the brush casing 21. To this end, the brush casing 21 is provided with the plurality of apertures 25 illustrated in FIG. 2. The apertures 25 are conveniently provided in the side wall 37 in parallel spaced rows of apertures encircling the circumference of the brush casing 21. Also, in order to provide for an accumulation of water adjacent to the apertures 25, the side wall 37 is provided with a plurality of interior ribs or ledge portions 93 which act to channel the outwardly directed water spray to the available apertures 25. The preferred materials of construction of the brush unit 20 are of sturdy, light weight plastics, rubber-like gaskets, alloyed or steel shafts, fiber pads and other suitable materials as might be selected from state-of-the-art materials.

Figure 5:
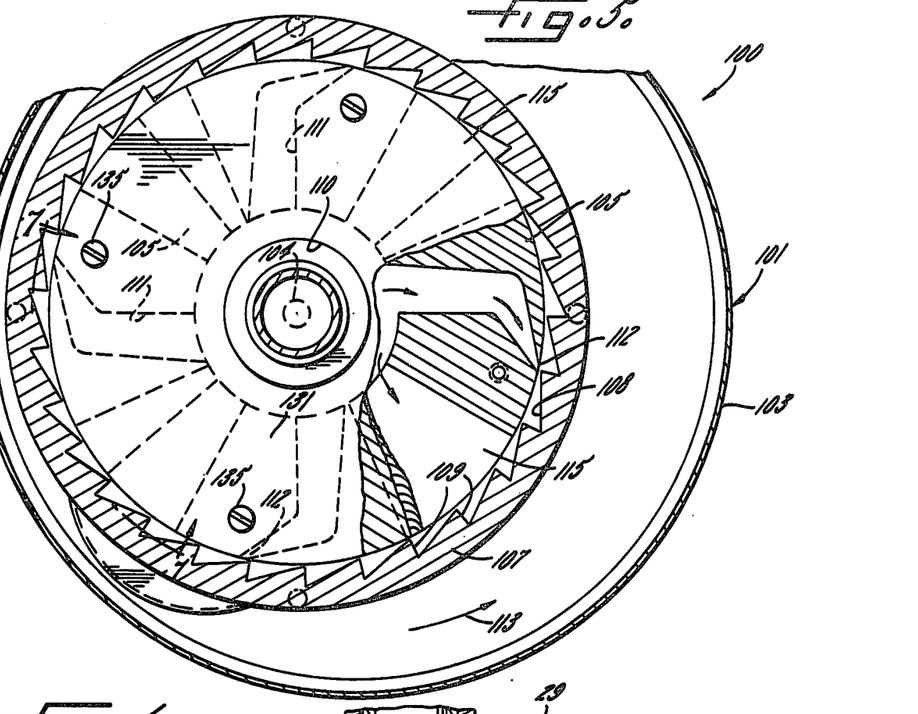
FIG. 5 is a partial sectional top view similar to FIGS. 3 and 4 but showing alternative embodiments of the flywheel gear means and fluid outlet chamber.

FIG. 5 discloses an alternative embodiment of the brush unit 20 identified as brush unit 100 and shown in sectional view similar to the sectional view of the brush unit 20 of FIGS. 3 and 4. An outer brush casing 101 includes a circular apertured side wall 103 defining an interior cavity wherein there is pivotally mounted, as on a center shaft 104, flywheel gear means 105. The alternative flywheel gear 105 is centrally mounted within an interior gear mounting support chamber or housing enclosure 107. The gear housing 107 is provided with an in-line row of pocket-like indentations or recessed areas comprising indentation blade means 108 along the inner peripheral diameter thereof. FIG. 5 shows a sectional view of the gear housing 107 cut along a plane disclosing the saw tooth profile of the indentation blade means 108, but it is to be understood that the gear housing 107 includes upper and lower surfaces (not clearly shown) which combine to comprise side walls for permitting retention of fluid within the individual pockets of the blade means 108. Further, the gear housing 107 completely encircles the outer peripheral edge portion of the flywheel gear 105 and is closely spaced therefrom to position the individual pockets of the blade means 108 for being filled by the pressurized fluid flow.

In accordance with this alternative design of the present invention, the flywheel gear 105 also comprises a fluid outlet chamber wherein the flywheel gear has a central fluid-receiving chamber 110 to be connected to hose extension means 31a (FIG. 6) and a plurality of radially extending internal fluid chambers 111. The outer extremeties of the internal fluid chambers 111 are narrowed to comprise fluid outlet orifices 112, respectively, for providing outlet flow means for the desired operation of said flywheel gear means 105. The pocket blade means 108 are provided with shoulder faces 109, respectively, and the fluid flow is directed through the plurality of outlet orifices 112 to strike against the shoulder faces to impart rotary motion to the flywheel gear 105. Additional momentum is provided by the build-up of pressure from the phenomenon of the pressurized fluid completely filling the pocket blade means 108 and thereafter being captivated within the individual pocket blade areas 108 until fluid discharge is allowed by the presentation of a fluid discharge pocket area 115 immediately following each fluid chamber 111 when considering the rotary motion of the flywheel gear 105 in the direction of the arrow 113 in FIG. 5.

Figure 6:
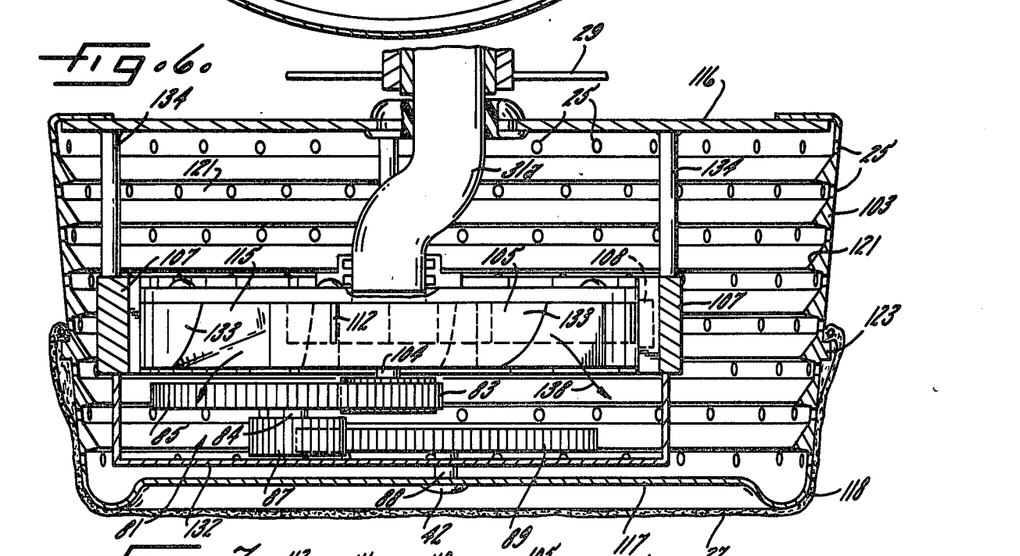
FIG. 6 is a cross-sectional view of the rotary brush unit similar to FIG. 2 but including the alternative embodiments of FIG. 5.
Figure 7:
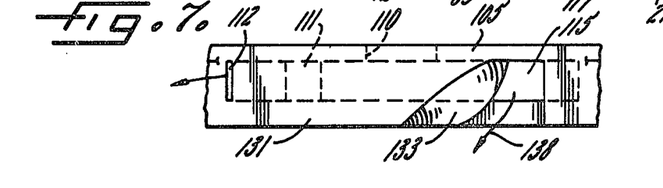
FIG. 7 is a side view of a fractional section of the alternative flywheel gear means of FIG. 6 showing a fluid outlet orifice and a fluid discharge blade.

FIGS. 5-7 show the application of the alternative flywheel gear 105 within the brush unit 100. It is clearly seen from FIG. 6 that the flywheel gear 105, together with the surrounding gear housing 107 comprise the only changes to the structure shown in FIG. 2 for the brush unit 20. Briefly recited herein, the brush unit 100 includes a plurality of the apertures 25 in the circular side wall 103, a top wall 116 and a recessed bottom wall 117 forming an outer raised ridge portion 118 to be used with the fitted pad means 27 as hereinbefore explained. The side wall 103 includes internal ledge portions 121 inclined toward an associated plurality of the apertures 25 to expedite channeling of discarded fluid spray though the apertures 25 for preventing undue accumulation of fluid within the outer brush casing 101. An outer ledge portion 123 is similarly utilized to the ledge portion 43. The accompanying reduction gear assembly means 81 is the same as shown in FIG. 2 and a reference to FIG. 6 discloses the use of the same identifying reference numerals to the plurality of composition parts.

With particular reference to FIGS. 5-7, the flywheel gear 105 is shown to be comprised of a plurality of alternating thickened portions 131, each of which includes internally thereto a single one of the radially extending fluid chambers 111. FIGS. 6 and 7 clearly show the outlet orifice 112 of a selected one of the fluid chambers 111. Obviously, the size and shape of the outlet orifice 112 can be varied to adjust the speed and force of the exiting fluid flow, and the size and shape of the orifice 112 shown in the drawing is illustrative only. The flywheel gear 105 and encircling gear housing 107 are suitably positioned within the inner cavity area of the outer brush casing 101 as through the use of suitable support brace or wall members 132 and mounting posts 134 accommodating suitable fastener devices 135 shown in FIGS. 5 and 6. The flywheel gear 105 includes the fluid discharge pocket areas 115 positioned intermediately of the thickened portions 131 of the flywheel gear 105. Each fluid discharge pocket area 115 is structured to include a fluid discharge blade 133, which blade is employed to force the discharge of fluid downwardly in the direction of the arrow 138 in FIGS. 6 and 7.

Figure 8:
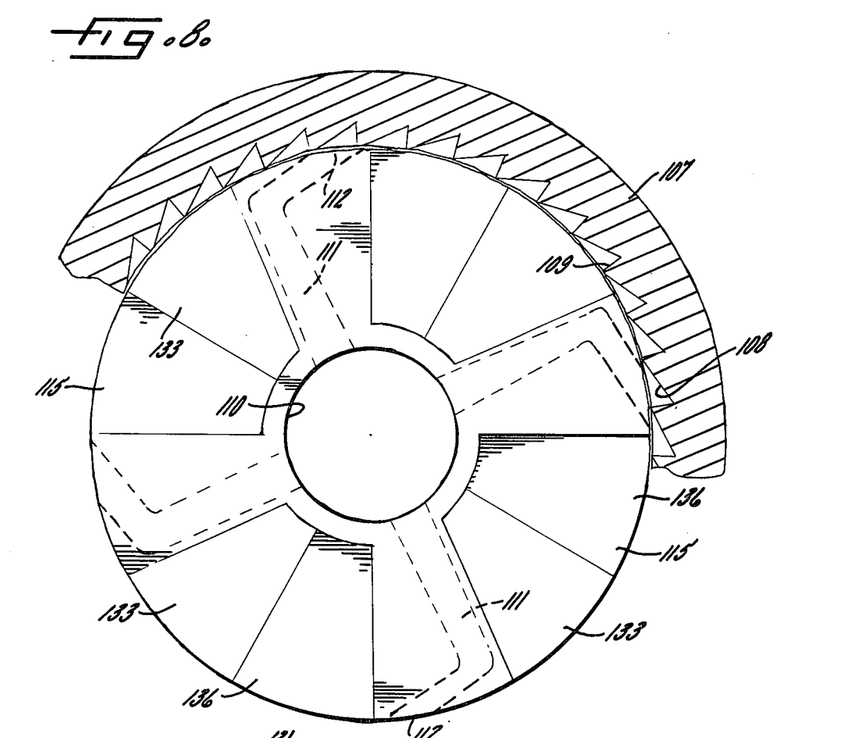
FIG. 8 is an isolated bottom view of the alternative flywheel gear means showing fluid flow chambers in dashed lines and showing the fluid discharge blade.
Figure 8A:
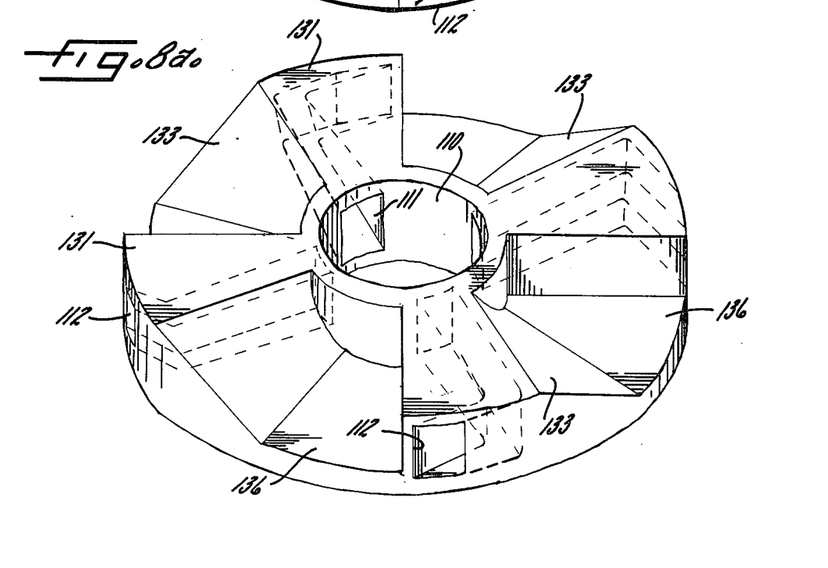
FIG. 8A is an isolated bottom perspective view of the alternative flywheel gear means more clearly showing the fluid discharge blade and the fluid flow chamber interior openings and outlet orifices.

FIGS. 8 and 8A are provided to isolate the structure of the flywheel gear 105 and the gear housing 107. FIG. 8A shows the flywheel gear 105 in a bottom perspective view to more clearly illustrate the particular structure of the flywheel gear 105 when designed to function also as the fluid outlet chamber. FIG. 8 is also a bottom view of the flywheel gear 105 primarily used to show the preferred beveled incline of the fluid discharge blade 133. In the intended operation of the alternative flywheel gear 105, the flywheel gear 105 is suitably pivotably mounted on its center shaft 104 and positioned within the gear housing 107 so that the plurality of fluid orifices 112 are aligned with the pocket blade areas 108. A pressurized fluid flow is channeled into the center fluid chamber 110, through the radially extending fluid chambers 111 and out of the narrowed fluid orifices 112 to strike against the adjacent ones of the shoulder faces 109. The fluid flow completely fills the pocket blade areas 108 as the orifice 112 rotates by and this fluid is substantially prevented from discharge from the pocket areas 108 so long as the thickened portion 131 of the flywheel gear 105 is adjacent to the fluid filled pocket areas 108. When rotation of the flywheel gear 105 brings the next adjacent fluid discharge pocket area 115 into alignment with the fluid filled pocket areas 108, the fluid is released for discharge from the pocket areas 108 in a downward direction beneath a thin top wall portion 136 as shown by the arrow 138 in FIGS. 6 and 7. The speed of rotation of the flywheel gear 105 controls the length of time in which the alignment of the fluid discharge pocket area 115 is presented to a selected one of the fluid filled pocket areas 108. Accordingly, the provision of the fluid discharge blade 133 is to forcedly jettison all fluid spillage present in the fluid discharge area 115.

Figure 9:
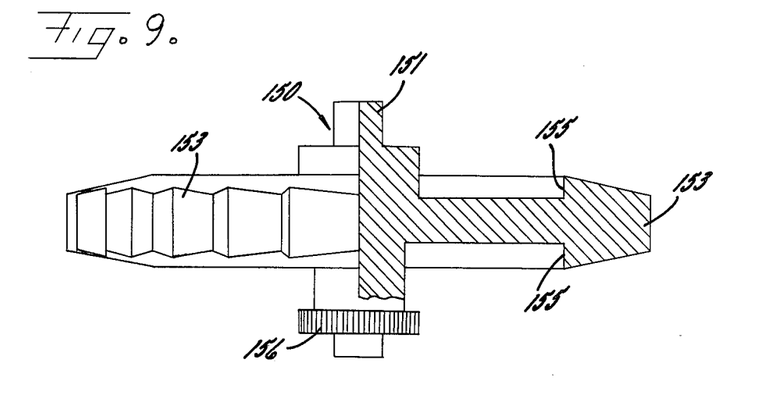
FIG. 9 is a partial sectional side or edge view of a second alternative flywheel gear means showing protruding saw tooth blade means shaped to comprise the outer peripheral edge portion thereof and having interior portions of the flywheel gear removed for economy of material.
Figure 10:
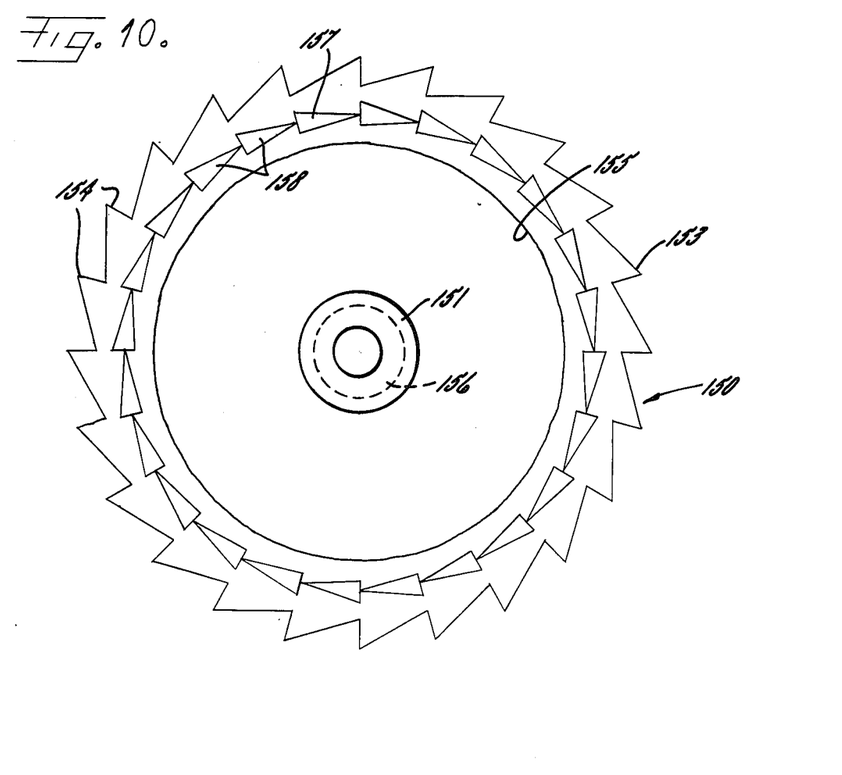
FIG. 10 is a top view of the second alternative flywheel gear means of FIG. 9 showing an in-line plurality of fluid receiving apertures or recesses closely spaced from the plurality of the protruding blade means.

FIGS. 9 and 10 show still another alternative flywheel gear means 150 which includes raised hub axle means 151 suitable to accommodate a central pivotal mounting and has the outer peripheral edge portion thereof particularly shaped to comprise a plurality of protruding blade means 153. As shown in FIG. 10, the blade means 153 define a saw tooth pattern and each thereof has a shoulder face 154 against which a fluid flow stream can be forcedly directed. The flywheel gear 150 optionally includes recessed areas 155 wherein excess material has been eliminated to reduce weight and friction in the use of the flywheel gear 150. The flywheel gear 150 includes a lower mounted pinion gear 156 which is employed to engage and drive the gear 85 of the gear assembly 81 of the primary embodiment of the invention. Therefore, it is understood that the flywheel gear 150 is employed with the fluid outlet chamber 47, it only being required that the overlying adjacent surfaces 57 of the fluid outlet chamber 47 be correspondingly beveled or inclined to provide the closely mounted spacing necessary to captivate fluid between the individual blades 153. In addition to the primary blades 153, secondary blade means 157 can be used in the embodiment of adjacently spaced in-line continuous recesses or indentations also having shoulder faces 158 against which to direct the fluid flow stream. As was shown in connection with the primary embodiment, a row of such recesses 157 can be placed on each side of the primary blade means 153, only a single row thereof being shown for illustration purposes in FIG. 10.

Figure 11:
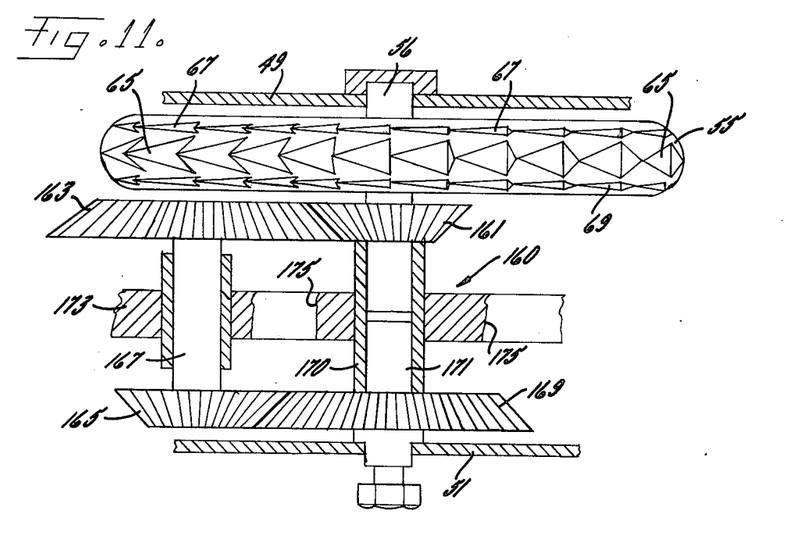
FIG. 11 is a partial sectional side view showing the primary embodiment of the flywheel gear means of FIG. 2 used with alternative reduction gear assembly means.

FIG. 11 shows an alternative gear assembly means 160 useful in conjunction with the present invention. The gear assembly means 160 is shown used in connection with the primary embodiment of the flywheel gear 55 of FIG. 2, which flywheel gear 55 is illustrated by the same reference numerals used in FIG. 2. The flywheel gear 55 is mounted on the center shaft 56 which shaft 56 is elongated to extend substantially toward the support plates 49 and 51. The gear assembly means 160 is comprised of a first pinion gear 161, a first reduction gear 163, a second pinion gear 165, a second parallel spaced gear shaft 167, and a second reduction gear 169. The first pinion gear 161 is centrally mounted on the shaft 56, the teeth of which engage with the first reduction gear 163, which gear 163 is mounted for rotation on the second gear shaft 167. The second pinion gear 165 has outer peripheral teeth which engage with the teeth of the second reduction gear 169 to drive the gear 169. The gear 169 is mounted on a third gear shaft 171 conveniently mounted in the same side walls or footings 170 as support the main flywheel gear shaft 56. The outer brush casing 21 is fixedly attached to the rotating third gear shaft 171. A central support brace 173 is provided to support the rotatable mountings and suitable openings therethrough shown at 175 are provided to allow discharge of fluid without undue accumulation.

Figure 12:
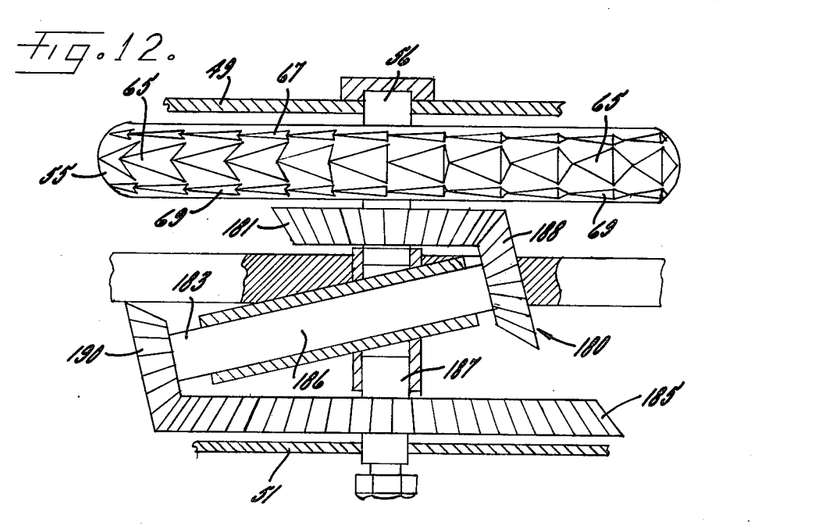
FIG. 12 is a partial sectional side view showing the flywheel gear means of FIG. 2 used with still another alternative reduction gear assembly means.

There is shown in FIG. 12 still another alternative gear assembly means 180 which can be employed with the present invention. The gear assembly means 180 is shown used in conjunction with the flywheel gear 55 and includes a first pinion gear 181 mounted on the center gear shaft 56, a traverse or diagonal gear assembly 183 engaging the first pinion gear 181, and a reduction gear 185 also engaged by the diagonal gear assembly 183. The gear 185 is mounted on a center rotatable gear shaft 187 which turns the outer brush casing 21. The traverse or diagonal gear assembly 183 is comprised of a rotatable gear shaft 186 and two end mounted pinion gears 188 and 190. The alternative gear assemblies 160 and 180 are thought to be useful in providing for different spacing allocations of the inner cavities of several outer brush casings.

Figure 13:
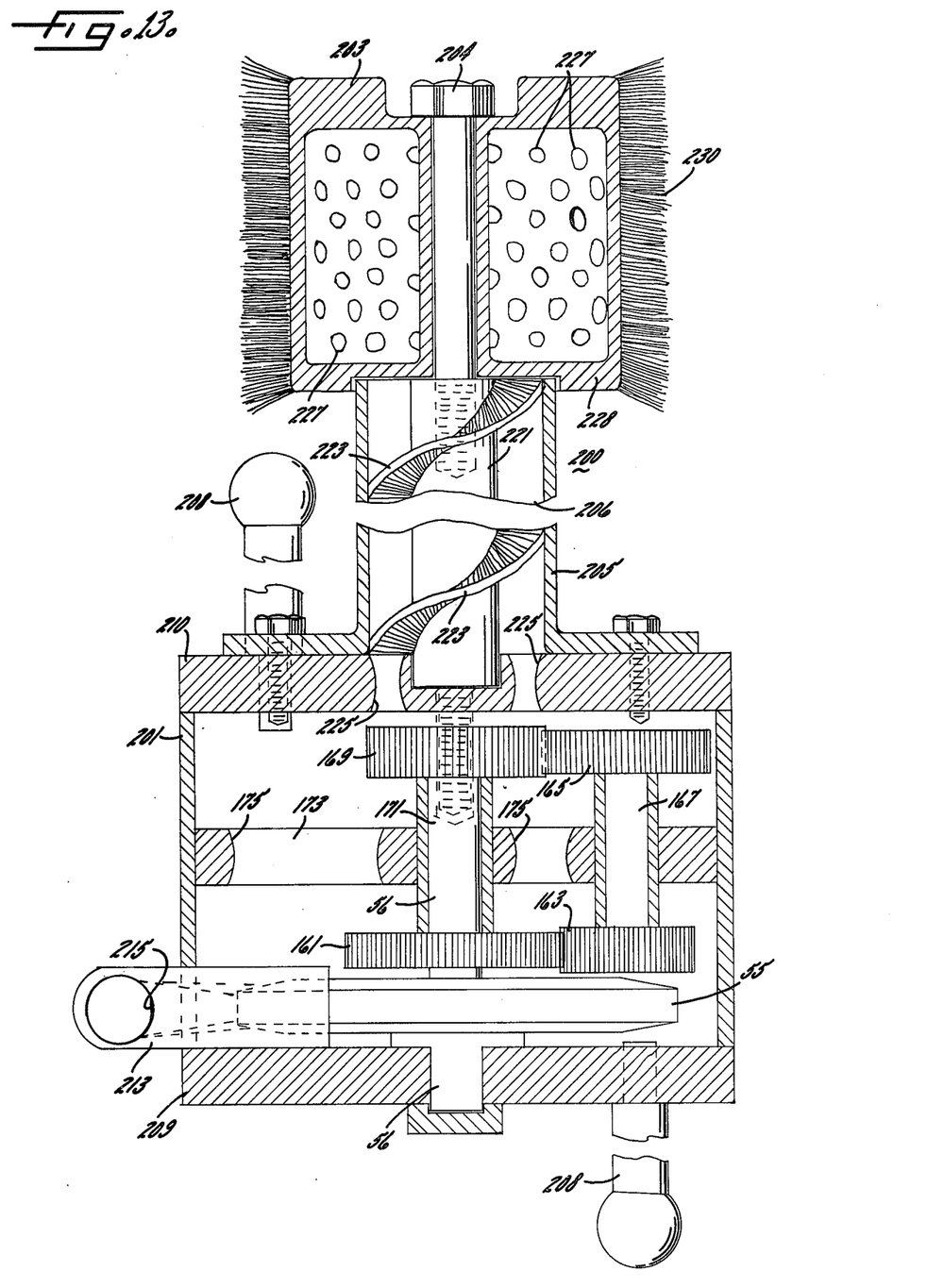
FIG. 13 is a cross-sectional view of an alternative rotary brush unit to that shown in FIG. 1 including the gear means means of FIG. 11 and having alternative rotary brush means.

FIG. 13 discloses an alternative brush unit 200 which is preferably a hand-held unit comprised of a base tubular section 201 and a rotary tubular brush applicator 203 mounted by suitable fastener 204 threaded into an extended elongated tubular shaft 205. The length of the extended shaft 205 is shown broken at 206 in FIG. 13 for illustration purposes. Handle means 208 are attached to upper and lower walls 209 and 210 of the base section 201, said handle means providing facility of manual use of the brush unit 200. A fluid-carrying chamber 213 is provided with an opening 215 for receiving the fluid flow stream of a connectible fluid supply.

The base section 201 is sealed to prevent the discharge of fluid through any other fluid outlet but through the hollow fluid-carrying extendable shaft 205. There is provided flywheel means like the flywheel gear 55 for being driven by the fluid flow stream and accompanying gear assembly means like the gear assembly means 160 of FIG. 11. The gear assembly means 160 is shown through the use of the same reference numerals in order to more briefly treat the explanation of the alternative brush unit 200. The extendable shaft 205 is comprised of an outer tubular section 220 and an inner rotatable shaft 221 which turns within the tubular section 220. The inner shaft 221 is threaded into the rotatable gear shaft 171 in order to provide for the rotation of the inner shaft 221. The inner shaft 221 has worm gear means having a curved blade 223 coiled around and attached for rotation with the inner shaft 221. Suitable openings 225 are provided in the lower wall 210 of the base section 201 to provide fluid channels whereby fluid flows into the inner confines of the extendable shaft 205. The rotating action of the worm gear or blade 223 is effective to propel the fluid in the inner shaft 205 toward the outer terminal end portion thereof where the fluid is discharged through suitable apertures 227 in the circular wall 228 of the brush applicator 203. The brush applicator is provided with extending bristle means 230 which combine with the discharge fluid flow to provide scrubbing washing action. It is to be understood that suitable openings are provided for fluid flow from the extendable shaft 205 to the brush applicator 203, and that a variety of brush applicators of different shapes and sizes and bristle lengths and hardnesses can be provided. Further, even though the brush unit 200 has been illustrated in a vertical position with the fluid flow from bottom to the top thereof, the brush unit will be held in a full 360 degrees of positions at all possible angles during use and application thereof, and the discharge of fluid will not be unduly impeded by gravity as in the full vertical position.

It is to be understood that while the present invention has been shown and described with reference to the preferred embodiments thereof, the invention is not to be limited to the precise mechanical arrangements set forth, and that various modifications and changes may be made by those skilled in the art without departing from the spirit and scope thereof.

What is claimed is:

1. A rotary brush mechanism for use with a source of pressurized transmittable fluid comprising in combination generally tubular rotatable outer housing means defining an interior cavity therein and containing a plurality of apertures in a tubular side wall thereof, internal support housing means connectible to said source of pressurized fluid and including fluid outlet chamber means having at least one fluid outlet orifice therein, first gear means pivotably mounted on said internal support housing means and having the outer peripheral edge portion thereof at least partially encased by said fluid outlet chamber means, blade means provided on said outer peripheral edge portion of said first gear means and being positioned to pivot in closely spaced relationship to said encasing fluid outlet chamber means and being adjacently disposed to said fluid outlet orifice, said blade means being forcedly struck by the fluid being discharged from said orifice for imparting rotary motion to said first gear means, second gear means pivotably mounted in said outer housing means and connecting rotary motion of said first gear means to said rotatable outer housing means, and said discharged fluid being forcedly expelled through said apertures by the rotary motion of said outer housing means, and brush means selectively attachable to said outer housing means for providing brushing action to accompany said discharging fluid.

2. A rotary brush mechanism as claimed in claim 1 wherein said blade means cooperate with said closely spaced encasing fluid outlet chamber means to retain said fluid between adjacently spaced blades thereof until said blade means rotatingly move from proximity with said encasing portion of said fluid outlet chamber means.

3. A rotary brush mechanism as claimed in claim 1 wherein said first gear means comprise flywheel gear means providing an inertia of movement and said second gear means comprise reduction gear means driven by said flywheel gear means, said reduction gear means including plurality of pinion and reduction gears for imparting a desired increase in rotational speed to said outer housing means.

4. A rotary brush mechanism as claimed in claim 1 wherein said blade means are comprised of at least one in-line row of recessed apertures spaced circumferentially along the outer peripheral edge portion of said first gear means, and each aperture thereof includes shoulder face means becoming aligned during rotational movement for being forcedly struck by said discharging fluid.

5. A rotary brush mechanism for use with a source of pressurized transmittable fluid comprising in combination generally tubular rotatable outer housing means defining an interior cavity therein and containing a plurality of apertures in a tubular side wall thereof, internal support housing means within said interior cavity, first gear means pivotably mounted within said interior cavity and including fluid outlet chamber means connectible to said source of pressurized fluid and having a plurality of fluid outlet orifices therein disposed to open on the outer peripheral edge portion thereof, said internal support housing means at least partially encasing the outer peripheral edge portion of said first gear means and having blade means provided thereon, said first gear means being positioned to pivot in closely spaced relationship to said encasing portion of said support housing means with said blade means being adjacently disposed to said fluid outlet orifices, said blade means being forcedly struck by the fluid being discharged from said orifices for imparting rotary motion to said first gear means, second gear means pivotably mounted within said outer housing means and connecting rotary motion of said first gear means to said rotatable outer housing means, and said discharged fluid being forcedly expelled through said apertures by the rotary motion of said outer housing means, and brush means selectively attachable to said outer housing means for providing brushing action to accompany said discharging fluid.

6. A rotary brush mechanism as claimed in claim 5 wherein said first gear means is comprised of alternating increased thickness portions and decreased thickness portions defining planar surfaces disposed intermediately there between, each of said increased thickness portions including internal thereto a single one of said fluid outlet chambers with a communicating fluid outlet orifice, said decreased thickness portions further defining recessed pocket areas and said planar surfaces being aligned to face outwardly therefrom, and said discharged fluid is held between adjacent blade means and is thereafter discharged into newly aligned ones of said recessed pocket areas as said recessed pocket areas rotate to become adjacently disposed to said fluid filled blade means, and said fluid is forcedly expelled by striking an adjacent planar surface with further rotational movement of said first gear means.

7. A rotary brush mechanism connectible to pressurized fluid source means and including in combination tubular rotatable outer housing means defining an interior cavity therein and containing a plurality of apertures in a side wall thereof, first gear means including blade means pivotably mounted within said interior cavity, fluid outlet chamber means positioned in the interior cavity and being connectible to said source of pressurized fluid and having fluid outlet orifices for discharging fluid therefrom, said blade means adjacently disposed to said fluid outlet orifices and being forcedly struck by said discharging fluid for imparting rotary motion to said first gear means, second gear means pivotably mounted within said outer housing means and connecting rotary motion of said first gear means to said rotatable outer housing means, and said discharged fluid being forcedly expelled through said apertures by the rotary motion of said outer housing means, and brush means selectively attachable to said outer housing means for providing brushing action to accompany said discharging fluid.

* * * * *